United States Patent [19]

Karube

[11] 4,080,540
[45] Mar. 21, 1978

[54] LOW-POWDERED STEPPING MOTOR

[75] Inventor: Yukuo Karube, Yokohama, Japan

[73] Assignees: Canon Kabushiki Kaisha; Canon Seiki Kabushiki Kaisha, both of Tokyo, Japan

[21] Appl. No.: 650,880

[22] Filed: Jan. 21, 1976

Related U.S. Application Data

[63] Continuation of Ser. No. 511,460, Oct. 2, 1974, abandoned.

[30] Foreign Application Priority Data

Oct. 8, 1973 Japan ................................ 48-112981

[51] Int. Cl.$^2$ ............................................. H02K 37/00
[52] U.S. Cl. ................................ 310/49 R; 310/67 R; 310/154; 310/219
[58] Field of Search ............ 310/49, 40 MM, 162-165, 310/231, 154, 224, 232, 219, 266, 208, 195, 198, 202, 90, 67

[56] References Cited

U.S. PATENT DOCUMENTS

| | | | |
|---|---|---|---|
| 2,590,298 | 3/1952 | Delastre | 310/224 |
| 2,894,156 | 7/1959 | Kent | 310/154 |
| 3,042,998 | 7/1962 | Sweety | 310/232 |
| 3,290,528 | 12/1966 | Adler | 310/266 |
| 3,329,846 | 7/1967 | Lawrenson | 310/266 |
| 3,370,263 | 2/1968 | Schreieck | 310/232 |
| 3,636,394 | 1/1972 | Forste | 310/232 |
| 3,686,514 | 8/1972 | Dube | 310/232 |

OTHER PUBLICATIONS

IBM Tech. Discl. Bulletin; Electromagnetic Stepping Actuator; G. A. Fisher; vol. 7, No. 1, 6/1974.

*Primary Examiner*—R. Skudy
*Attorney, Agent, or Firm*—Fitzpatrick, Cella, Harper & Scinto

[57] ABSTRACT

A low-powered stepping motor is rotated and controlled by a driving circuit generating a pulsating current has a fixed field system formed by a permanent magnet, a soft magnetic material, etc. and a rotor disposed within the fixed field system, and forming armature windings in which the windings perform stepping motion in response to a pulsating current from the driving circuit to cause stepping rotation of the rotor.

16 Claims, 12 Drawing Figures

LOW-POWDERED STEPPING MOTOR

This is a continuation, of application Ser. No. 511,460 filed Oct. 2, 1974 now abandoned.

BACKGROUND OF THE INVENTION

1. Field of the Invention

This invention relates to a low-powered stepping motor which is rotated and controlled by a driving circuit generating a pulsating current.

2. Description of the Prior Art

Various stepping motors have heretofore been proposed, each type of which is so constructed that the rotor is formed of a permanent magnet or a soft magnetic material and a stator is excited by field windings. However, since the rotor has a large amount of inertia, its self-start frequency characteristic is inevitably limited. On the other hand, if a high output is to be obtained, the configuration of the field windings becomes so complicated as to be difficult to manufacture.

SUMMARY OF THE INVENTION

It is a first object of the present invention to provide a stepping motor which overcomes the above-noted disadvantages inherent in the conventional stepping motor.

It is a second object of the present invention to provide a stepping motor which exhibits an improved self-start frequency characteristic.

It is a third object of the present invention to provide a high-output stepping motor which is easy to manufacture.

It is a fourth object of the present invention to provide a stepping motor in which the moment of inertia of the motor is small.

It is a fifth object of the present invention to provide a stepping motor of a coreless rotary winding type.

Other objects of the present invention will become fully apparent from the following detailed description taken in conjunction with the accompanying drawings.

DESCRIPTION OF THE PREFERRED EMBODIMENTS

Some specific embodiments of the stepping motor according to the present invention will particularly be described with particular reference to the drawings.

Figure 1:
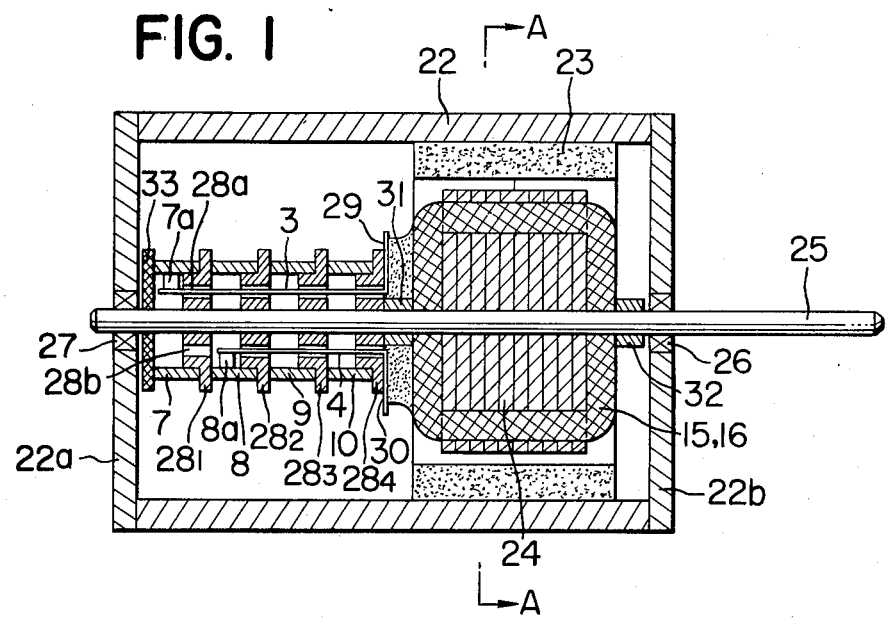
FIG. 1 is a longitudinal cross-sectional view illustrating an embodiment of the stepping motor according to the present invention.
Figure 2:
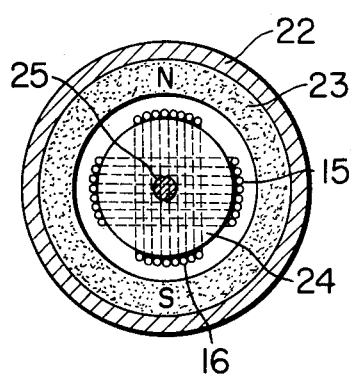
FIG. 2 is a cross-sectional view taken along the line A—A in FIG. 1.
Figure 3:
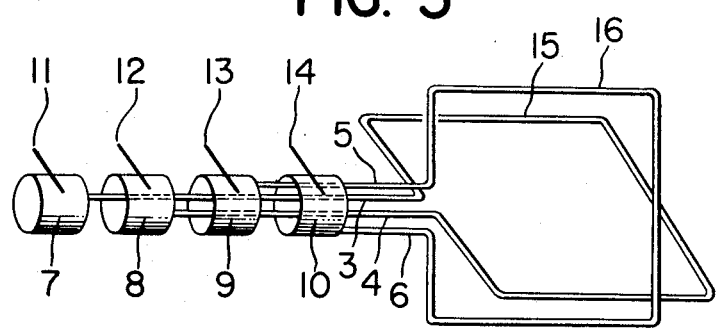
FIG. 3 is a perspective view for illustrating the principle of the stepping motor shown in FIG. 1, with the iron core, magnetic circuit member and permanent field magnet being removed and with the rectangular windings being depicted in a simplified form of single conductors for simplicity of illustration.

In FIGS. 1, 2 and 3 reference numeral 22 designates a hollow, cylindrically shaped, magnetic return circuit member formed of a soft magnetic material and having the opposite open ends thereof closed by members 22a and 22b. These members 22a and 22b have openings formed centrally thereof in which bearings 27 and 26 are fitted, respectively. An iron core 24 comprises a laminated core formed of a soft magnetic material, and rectangular windings 15 and 16 are wound on the iron core 24. The rectangular windings 15 and 16 are wound with their electrical angles displaced 90° with respect to each other. The iron core 24 and the rectangular windings 15, 16 together form a rotor. A rotor shaft 25 extends through the iron core 24 and is rotatably journalled by the bearings 26 and 27. Fixing members 31 and 32 formed of an insulating material are fitted onto the rotor shaft 25 adjacent the opposite ends of the iron core 24 to hold the iron core at a predetermined location on the rotor shaft 25. Terminals 3, 4, 5 and 6 of the rectangular windings 15 and 16 are connected to collector rings 7, 8, 9 and 10, which are respectively held equidistantly by collector ring holding members $28_1$, $28_2$, $28_3$ and $28_4$ of an insulating material mounted on the rotor shaft 25. The collector ring holding members $28_1$, $28_2$, $28_3$ and $28_4$ are formed with holes 28a, 28b, 28c and 28d respectively. Into the hole 28a, for example there is inserted the terminal 3 of the rectangular winding 15 which is joined to the collector ring 7 by solder 7a. In the same manner, the terminal 4 of the rectangular winding 15 is inserted into the hole 28b, and joined to the collector ring 8 by solder 8a, the hole 28c receives therethrough the terminal 5 of the rectangular winding 16 is inserted into the hole 28c, and joined to the collector ring 9, and the terminal 6 of the rectangular winding 16 is inserted into the hole 28d, and joined to the collector ring 10. A thrust taking member 33, which serves also as an oil thrower for bearings, is mounted on the rotor shaft 25. Designated by 23 is a permanent field magnet disposed on the inner peripheral surface of the magnetic return circuit member 22 and in opposed relationship with the rotor. The permanent field magnet 23 and the return circuit member 22 together constitute a stator. Brushes 11, 12, 13 and 14, as shown in FIG. 3, are respectively disposed in constant contact with the collector rings 7, 8, 9 and 10 and at the same time connected to a driving circuit (now shown) which generates pulsating current. These brushes 11, 12, 13 and 14 serve to permit the output current of the driving circuit to flow through the collector rings 7, 8, 9 and 10 to the rectangular coils 15 and 16.

Figure 4:
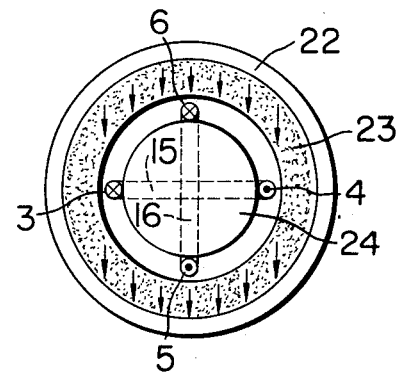
FIG. 4 is a cross-sectional view for illustrating the principle of the stepping operation of the stepping motor shown in FIGS. 1 and 2, with the rectangular windings being depicted as single conductors in dashed lines, but with their terminals alone being indicated in solid lines.

Referring to FIG. 4 operation of the stepping motor shown in FIGS. 2 and 3, with the rectangular coils 15 and 16 depicted as single conductors and by dashed lines but with the terminals thereof alone indicated the rectangular winding 15 and 16 are disposed orthogonally. Also, as shown, the permanent field magnet 23 is magnetized in one direction. It should also be understood that the air gap field is oriented in the same direction.

In the position shown in FIG. 4, if a current is caused to flow in the direction from the terminal 3 into the rectangular winding 15 and then out through the terminal 4, a force to be generated in the rectangular winding 15 does not produce a moment about the rotor shaft, so that the rotor remains stationary in the position of FIG. 4.

Next, when a rotational moment such as to cause the rotor to rotate either clockwise or counter-clockwise is imparted to the rotor, while the current continues to flow through the rectangular winding 15 from the terminal 3 to the terminal 4, there is produced such a rotational moment in the rotor that it detains the rectangular winding 15 at the position; as shown in FIG. 3. In other words, there is produced in the rectangular winding 15 a locking force which detains the winding 15 at a position perpendicular to the direction of the field system.

Next, if the current to the rectangular winding 15 is cut off, and a current is caused to flow through the rectangular winding 16 in the direction from the terminal 6 to the terminal 5, there is produced in the winding 16 a rotational moment which causes the rotor to rotate counter-clockwise by 90° until the rectangular winding 16 reaches a new balanced position. Again at the new balanced position, there is produced a locking moment which detains the rotor at the balanced position.

As described above, by repeating the sequential operations in such manner that a current is first supplied to the rectangular winding 15 to impart thereto a rotational moment, after which the current flow to the winding 15 is cut off, then a current is supplied to the rectangular winding 16 to impart thereto a rotational moment, after which the current flow to the winding 16 is cut off, and then a current is again supplied to the rectangular winding 15 but in the opposite direction to the previous one, the rotor performs the stepping rotation by 90° at each stage of the current flow.

Figure 5:
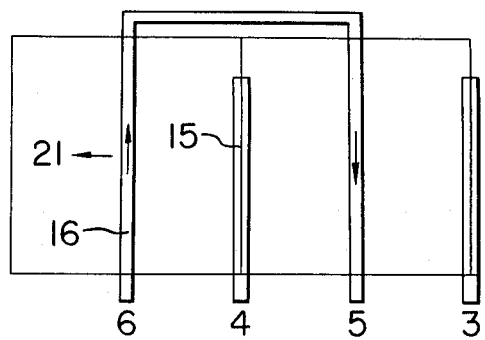
FIGS. 5 to 9 are developed views for further explaining the stepping motion in FIG. 4.
Figure 6:
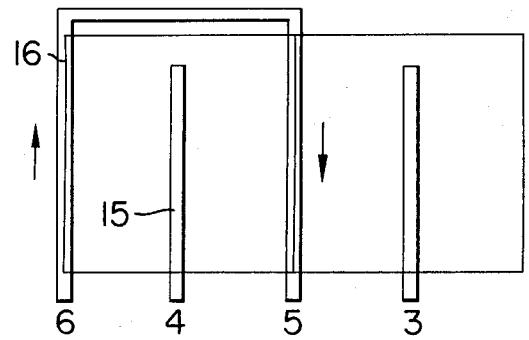
Figure 7:
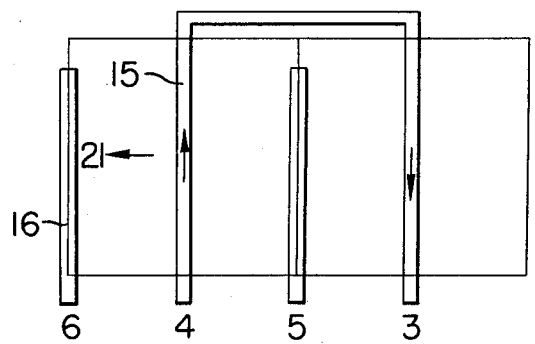
Figure 8:
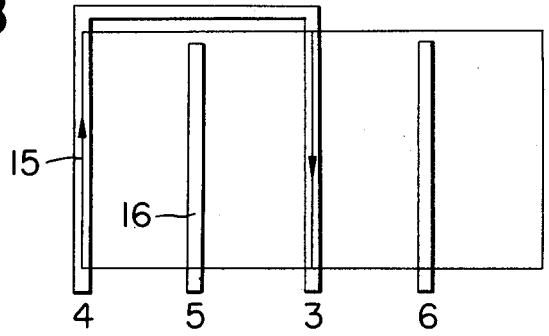
Figure 9:
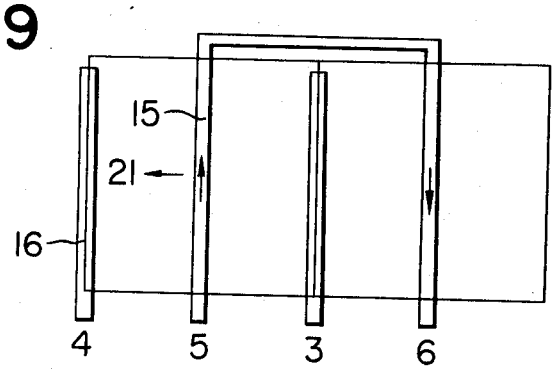

In FIGS. 4 and 5, if a current is caused to flow through the rectangular winding 16 in the direction from the terminal 6 to the terminal 5, there is produced a rotational moment which cause the rectangular winding 16 to rotate in the counter-clockwise direction 21, whereby the rotor rotates by 90° to a position as shown in FIG. 6. In this position, there is produced a moment which locks the rotor in such position. Next, if, as shown in FIG. 7, the current flow to the rectangular winding 16 is cut off and a current is caused to flow through the rectangular winding 15 in the direction from the terminal 4 to the terminal 3, the winding 15 takes a counter-clockwise rotational moment to rotate the rotor by 90° to a position as shown in FIG. 9.

Next, if the current flow to the rectangular coil 15 is cut off and a current is caused to flow through the terminal 6 in the direction from the terminal 15 to the rectangular winding 16, the rectangular winding 16 is subjected to a counter-clockwise rotational moment as indicated by 21, and the rotor is further rotated by 90°. Thus, by causing a current to flow alternately through the two rectangular windings as described above, sequential stepping operations may be accomplished.

Figure 10:
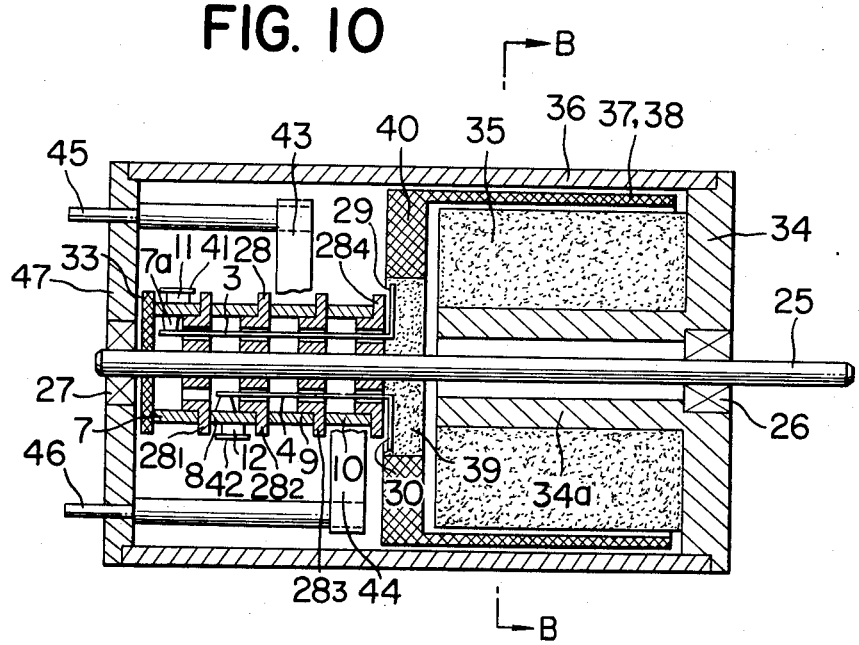
FIG. 10 is a longitudinal cross-sectional view showing a second embodiment of the coreless rotary winding type stepping motor according to the present invention, which utilizes the same principle as that of the stepping motor shown in FIGS. 1 and 2.
Figure 11:
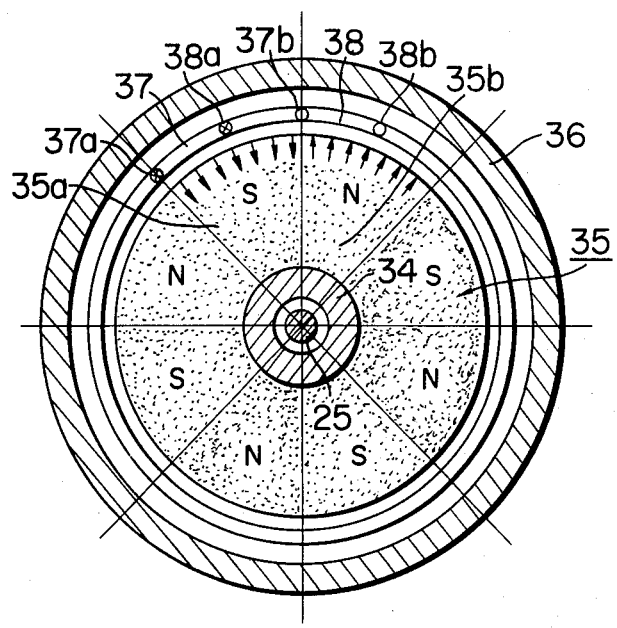
FIG. 11 is a cross-sectional taken along the line B—B in FIG. 10.
Figure 12:
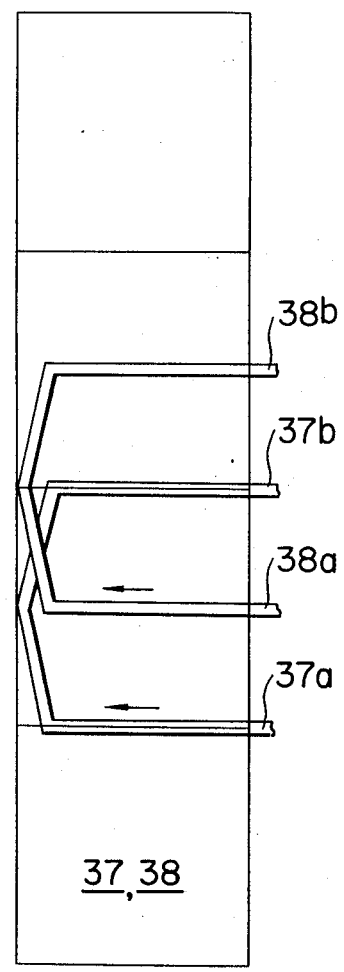
FIG. 12 is a developed view illustrating the configuration of the windings shown in FIG. 10, and for explaining the operation of the stepping motor shown in FIG. 10.

In FIGS. 10 and 11, those parts given similar reference numerals to those in FIGS. 1, 2 and 3 are similar in construction and function to those parts of the above-described first embodiment. A magnetic return circuit member 36 formed of soft magnetic material is in the form of a hollow cylinder having open opposite ends. A member 47 having a bearing 27 at the center thereof is mounted in one of the open ends of the magnetic return circuit member 36, and a member 34 having a hollow projection 34a is mounted in the other open end of the member 36 with the hollow projecting extending thereinto. A bearing 26 is fitted at the center part of the member 34. The bearing 27 provided in the member 47 and the bearing 26 provided in the member 34 rotatably support a rotor shaft 25. A permanent magnet 35 is mounted around the hollow projection 34a of the member 34, and magnetized in a direction perpendicular to the rotor shaft 25. In FIGS. 11 and 12, the magnet 35 is shown as magnetized to form four pairs of poles. The magnetic return circuit member 36, the members 34, 47, and the permanent magnet 35 together constitute the stator of the motor.

Coreless rotatable coils 37 and 38 are their electrical angles being displaced by 90° are disposed in an air gap formed between the permanent magnet 35 and the outer cylinder 36, and are secured at one end 40 to the rotor shaft 25 by means of insulative adhesive 39 or by means of an unshown auxiliary member. As shown in FIG. 12, these windings are formed in a hexagonal shape with the forwarding leads 37a, 38a and the returing leads 37b, 38b being formed to have one-half of the pole pitch, respectively. Actually, each coil 37, 38 comprises a plurality of continuous winding turns, but in the drawing, each coil is represented by a single mid-turn or one pitch of the actual winding turns for better understanding of the stepping operations.

Collector rings 7, 8, 9 and 10 correspond to those shown in FIGS. 1, 2 and 3. Connecting leads 29 and 30 connect the collector rings 7 and 8 to the terminals 3 and 4 of the winding 37. Although not shown, it will be noted that there are also provided connecting leads 29' and 30' which connect the collector rings 9 and 10 to the terminals 5 and 6 of the winding 38. These connecting leads are respectively secured to the collector rings by solder 7a. Brush springs 41, 42, 43 and 44 are provided to urge brushes 11, 12, 13 and 14 into sliding contact with the collector rings 7, 8, 9 and 10, respectively. The brush springs 41, 42, 43 and 44 are respectively held by brush spring holding members such as 45 and 46 and two additional holding members (not shown) therebetween which in turn are electrically connected to a driving circuit. Thus, a pulsating current from the driving circuit is supplied to the brushes 11, 12, 13 and 14 through the brush spring holding members such as, 45 and 46 and two additional holding members (not shown) therebetween.

Description will now be made as to the operations of the coreless rotatable coil type stepping motor.

If a current is caused to flow from the terminal 37a into the winding 37 and out through the terminal 37b, an electromagnetic force is produced in the winding 37. The electromagnetic force will produce a rotational moment which locks the winding 37, i.e., the coreless rotatable coil in the position as shown in FIG. 10.

Next, if the current flow to the winding 37 is cut off and a current is caused to flow through the winding 38 in such a manner that it flows into the terminal 38a and out from the terminal 38b, there is produced in the winding 38 a rotational moment which causes the rotor to rotate in the counter-clockwise direction until the winding 38 arrives at the position of the winding 37, i.e., until the rotor rotates by one-fourth of the pole pitch.

In the described manner, a current is first caused to flow through the winding 37 to produce a rotational moment therein, after which the current to the winding 37 is cut off, then a current is caused to flow through the winding 38 to provide a rotational moment therein, whereafter the current to the winding 38 is cut off, and a current is again caused to flow to the winding 37. Through repetition of such sequence of operation, the rotor performs the stepping rotation each corresponding to a quarter of the pole pitch. The current supply and interruption are carried out by appropriate means such as a driving circuit which generates pulsating current.

Thus, in the stepping motor according to the present invention, the windings effect stepping operations in accordance with the pulsating current supplied thereto in a fixed field system, and this leads to the provision of a low-powered but high-output stepping motor which is of low inertia and excellent in the self-start frequency characteristic.

I claim:

1. A stepping motor driven by a driving circuit generating a pulsating current, comprising in combination:
   a. a rotor having:
      1. a rotor shaft;
      2. first and second coils wound with their electrical angles displaced by substantially 90° with respect to each other;
      3. a first terminal drawn out of said first coil at a portion where the winding starts;
      4. a second terminal drawn out of said first coil at a portion where the winding terminates;
      5. a third terminal drawn out of said second coil at a portion where the winding starts;
      6. a fourth terminal drawn out of said second coil at a portion where the winding terminates; and
      7. a plurality of collector means disposed on said rotor shaft in a manner so as to be in parallel and sequentially arranged along the axial direction of said rotor shaft, a first collector electrically connected to said first terminal, a second collector electrically connected to said second terminal; a third collector electrically connected to said third terminal, and a fourth collector electrically connected to said fourth terminal, respectively;
   b. a stator provided with a hollow cylindrical permanent magnet which is magnetized in a perpendicular direction with respect to said rotor shaft, and which creates an air gap field to act on said rotor; and
   c. brush means having a first brush which is in elastic contact with said first collector and electrically connected therewith, a second brush which is in elastic contact with said second collector and electrically connected therewith, a third brush which is in elastic contact with said third collector and electrically connected therewith, and a fourth brush which is in elastic contact with said fourth collector and electrically connected therewith, each brush in said brush means being electrically connected to said driving circuit;

whereby said pulsating current is caused to flow sequentially through said brushes by said driving circuit so that said rotor may perform sequential stepping rotation at an electrical angle of 90°.

2. The stepping motor as claimed in claim 1, wherein said coils are disposed within said hollow cylindrical permanent magnet.

3. The stepping motor as claimed in claim 1, wherein said permanent magnet is provided with at least one pair of poles.

4. The stepping motor as claimed in claim 1, wherein said rotor is coreless, and formed in a hollow cylindrical cup shape, and said permanent magnet is formed with a smaller outer diameter than the inner diameter of the hollow cylinder of said coreless rotor and disposed in a manner to project into the hollow cylinder of said rotor.

5. The stepping motor as claimed in claim 4, wherein said permanent magnet is provided with at least two pairs of the poles.

6. The stepping motor as claimed in claim 1, wherein said collector means is provided with a plurality of collector holding members made of an insulating material and mounted on said rotor shaft so as to be sequentially along the axial direction of said rotor shaft, and at least three collectors of said collector means are fixedly provided on said rotor shaft by being held in sequence between said different collector holding members.

7. The stepping motor as claimed in claim 6, wherein said collector means is provided with a thrust preventive means to prevent said collector holding members and said collectors from being displaced in the axial direction of said rotor shaft.

8. The stepping motor as claimed in claim 2, wherein said coils are wound on a core of soft magnetic material fixedly provided on said rotor shaft for a required number of turns and in a rectangular shape.

9. A stepping motor driven by a driving circuit generating a pulsating current, comprising in combination:
   a. a rotor having:
      1. a rotor shaft;
      2. a core made of soft magnetic material fixedly provided on said rotor shaft;
      3. first and second coils wound on said core for a required number of turns and in a rectangular shape with their electrical angles being displaced by substantially 90° with respect to each other;
      4. a first terminal drawn out of said first coil at a portion where the winding starts;
      5. a second terminal drawn out of said first coil at a portion where the winding terminates;
      6. a third terminal drawn out of said second coil at a portion where the winding starts;
      7. a fourth terminal drawn out of said second coil where the winding terminates; and
      8. collector means disposed on said rotor shaft in a manner so as to be in parallel and sequentially arranged along the axial direction of said rotor shaft, a first annular collector electrically connected to said first terminal, a second annular collector electrically connected to said second terminal, a third annular collector electrically connected to said third terminal, and a fourth annular collector electrically connected to said fourth terminal;
   b. a stator provided with a hollow cylindrical permanent magnet which is magnetized in a perpendicular direction with respect to said rotor shaft, and which creates an air gap field to act on said rotor; and
   c. brush means having a first brush which is in elastic contact with said first collector and electrically connected therewith, a second brush which is in elastic contact with said second brush and electrically connected therewith, a third brush which is in elastic contact with said third collector and electrically connected therewith, and a fourth brush which is in elastic contact with said fourth collector and electrically connected therewith, each brush in said brush means being electrically connected to said driving circuit, whereby said pulsating current is caused to flow sequentially through said brushes by said driving circuit so that said rotor may perform sequential stepping rotation at an electrical angle of 90°.

10. The stepping motor as claimed in claim 9, wherein said core is a laminated core.

11. The stepping motor as claimed in claim 9, wherein said collector means is provided with a plurality of substantially annular collector holding members made of an insulating material and mounted on the rotor shaft in a manner so as to be sequentially along the axial direction of said rotor shaft, and with a thrust preventive member in a substantially disk shape to prevent said collector means from being thrust-displaced in the axial direction of said rotor shaft, at least three of said collectors of said collector means being fixedly secured on said rotor shaft by being held between adjacent collector holding members, and the remaining one of said collectors being fixedly secured on said rotor shaft by being held between one of said collector holding members and said thrust preventive member.

12. The stepping motor as claimed in claim 9, wherein said permanent magnet is provided with two pairs of poles.

13. A stepping motor driven by a driving circuit generating a pulsating current, comprising in combination:

a. rotor having:
 1. a rotor shaft;
 2. a rotary coil body formed in a hollow cylindrical cup shaped by first and second coils wound with their electrical angles displaced by substantially 90° with respect to each other;
 3. a first terminal drawn out of said first coil at a portion where the winding starts;
 4. a second terminal drawn out of said first coil at a portion where the winding terminates;
 5. a third terminal drawn out of said second coil at a portion where the winding starts;
 6. a fourth terminal drawn out of said second coil at a portion where the winding terminates;
 7. collector means including a first annular collector electrically connected to said first terminal, a second annular collector electrically connected to said second terminal, a third annular collector electrically connected to said third terminal, and a fourth annular collector electrically connected to said fourth terminal; and
 8. four collector holding members made of insulating material and fixedly mounted on said rotor shaft along the axial direction thereof to thereby dispose sequentially and in parallel each of said collectors of said collector means on said rotor shaft along the axial direction thereof, said collector holding members holding each of said collectors individually between adjacent collector holding members;

b. a stator provided with a hollow cylindrical permanent magnet which is magnetized in a perpendicular direction with respect to said rotor shaft, and which creates an air gap field to act on said rotor; and c. brush means including a first brush which is in elastic contact with said first collector and electrically connected therewith, a second brush which is in elastic contact with said second collector and electrically connected therewith, a third brush which is in elastic contact with said third collector and electrically connected therewith, a fourth brush which is in elastic contact with said fourth collector and electrically connected therewith, each brush of said brush means being electrically connected with said driving means, whereby said pulsating current is caused to flow sequentially through said brushes by said driving circuit so that said rotor may perform sequential stepping rotation at an electrical angle of 90°.

14. The stepping motor as claimed in claim 13, wherein at least one of said five collector holding members in said collector means functions to prevent said collector means from being thrust-displaced in the axial direction of said rotor shaft.

15. The stepping motor as claimed in claim 13, wherein said permanent magnet is provided with four pairs of poles.

16. The stepping motor as claimed in claim 13, wherein said rotor shaft is disposed in and through the substantial center part of said cylindrical permanent magnet.

* * * * *

UNITED STATES PATENT AND TRADEMARK OFFICE
CERTIFICATE OF CORRECTION

PATENT NO. : 4,080,540
DATED      : March 21, 1978
INVENTOR(S) : YUKUO KARUBE

It is certified that error appears in the above–identified patent and that said Letters Patent are hereby corrected as shown below:

On Title page, Column 2, under "Abstract", lines 2-3, after "pulsating current" insert --and--.

Column 2, lines 41-42, delete "the hole 28c.....therethrough"; lines 62-65, delete "operation of the stepping motor.....thereof alone indicated".

Column 3, line 16, after "position" delete ";"; line 56, change "15" to --5--.

Column 4, line 17, delete "are" and insert --with--.

Column 6, line 66, delete "brush" and insert --collector--.

Column 8, line 36, delete "five" and insert --four--.

On Title page, [54] change "LOW-POWDERED STEPPING MOTOR" to --LOW-POWERED STEPPING MOTOR--.

Signed and Sealed this

Twenty-second Day of July 1980

[SEAL]

Attest:

SIDNEY A. DIAMOND

Attesting Officer    Commissioner of Patents and Trademarks